July 26, 1938. A. ISAAC Re. 20,809

TULLE AND LACE COMPRISING MULTIPLE ELASTIC THREADS

Original Filed Sept. 24, 1934 2 Sheets-Sheet 1

INVENTOR

By Augustin Isaac,

Watson, Cole, Grindle & Watson

ATTY'S.

July 26, 1938. A. ISAAC Re. 20,809

TULLE AND LACE COMPRISING MULTIPLE ELASTIC THREADS

Original Filed Sept. 24, 1934 2 Sheets-Sheet 2

Inventor

Augustin Isaac,

By Watson, Cole, Grindle & Watson

Attorneys

Reissued July 26, 1938

Re. 20,809

UNITED STATES PATENT OFFICE 20,809

TULLE AND LACE COMPRISING MULTIPLE ELASTIC THREADS

Augustin Isaac, Lyon, Rhone, France, assignor to Dognin-Société Anonyme, Villeurbanne, Rhone, France, a company of France Original No. 2,039,419, dated May 5, 1936, Serial No. 745,329, September 24, 1934. Application for reissue April 25, 1938, Serial No. 204,565. In France October 12, 1933

19 Claims. (Cl. 96—24)

The present invention has for its object the manufacture of elastic fabrics, such as nets, woven or knitted meshes, tulles and laces made on any kind of frame, loom, knitting machine or other fabric making machine including a plurality of warp threads and a plurality of weft threads and the characteristic feature of which consists in that one of these series of threads is made of inextensible threads while the other series consists of extensible threads, one of said series preferably being arranged in multiple and most desirably the elastic threads being arranged in multiple.

In other words, each warp thread (in the case of an elastic warp) or each weft thread (in case of an elastic weft) consists of a plurality of elastic thread elements.

The elastic fabric thus manufactured, in which the multiple elastic thread performs, in the course of the manufacture and in the fabric, the same function as a simple thread, possesses elasticity not only in the direction of the elastic threads but also in a direction at right angles and diagonally to said elastic threads.

In one embodiment, the fabric comprises elastic threads running only in a transverse or horizontal direction and inelastic connecting threads which are wrapped around and interlaced with the elastic threads in such a way that considerable vertical extensibility or stretch and contractive force results from the pull of the inelastic threads upon the elastic threads running in the opposite direction.

The preferred fabric has elastic threads running only in one direction but is capable of stretching simultaneously to a substantial extent in two directions while at the same time employing considerably less elastic thread than if the elastic threads extended in two directions, thereby reducing the weight and bulk of the fabric, and assuring an unusual degree of ventilation.

Fabrics according to the present invention possess the following advantages:

If the tension or the resistance of one of these elastic threads used in combination is weak or irregular, it is practically compensated for by the action of the other thread or threads associated with the first mentioned one. If one of the associated threads is broken or cut, either during the manufacture or when in use, the other thread, or threads, remain and therefore add to the damage resulting from the breaking of one thread. As a matter of fact, if one of three associated threads is broken, its size is only one third of that of an equivalent single thread and the knot that is made is practically invisible and hidden under the other threads. On the contrary, a knot of an equivalent single big thread is very big and produces a defect in the fabric which can be repaired but incompletely and with great difficulty. This makes it practically impossible to produce a net without defects.

A preferred embodiment of the present invention will be hereinafter described with reference to the accompanying drawings, given merely by way of example, and in which.

Figure 1:
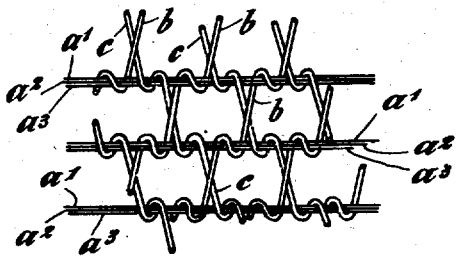
Figure 1 is a diagrammatical view of a tulle fabric including elastic warp threads and inextensible weft threads.

As shown in the drawings, the fabric consists of a plurality of warp threads, each warp thread consisting of a plurality of associated elastic threads, three in the example shown in the drawings, to wit: $a'$, $a^2$ and $a^3$. The inextensible weft threads, $b$, $c$, are wound about these warp threads and are inclined in opposite directions with respect thereto so as to form the net fabric.

Figure 2:
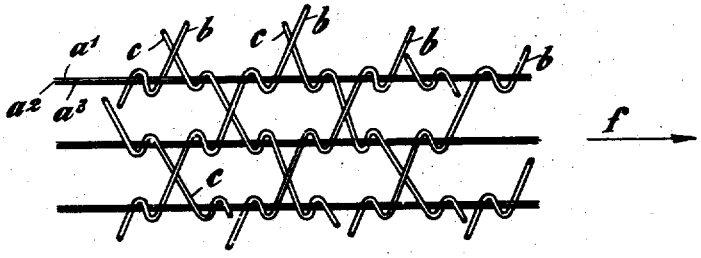
Figure 2 shows the deformation of the tulle fabric in the direction of the elastic threads.
Figure 3:
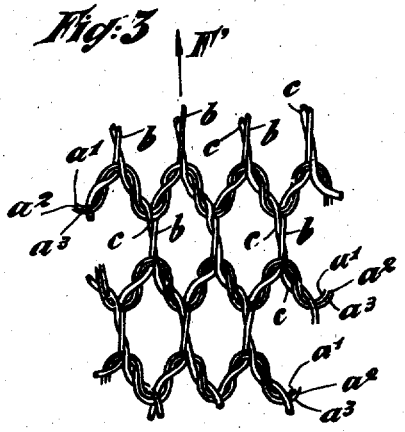
Figure 3 shows the deformation of the tulle fabric in a direction at right angles to the elastic threads.

When this fabric is subjected to a tension in the direction of the warp threads, the fabric is deformed in the direction of arrow $f$, as shown in Figure 2. Furthermore, and although the weft threads that are used are inextensible, the elastic fabric that is obtained is extensible in the direction of the weft threads, as shown in Figure 3, in which it has been supposed that the fabric is subjected to opposed stresses F, F'. The elasticity of the fabric in the transverse direction or direction at right angles to the warp threads is due to two reasons:

*a*. The substantially sinusoidal deformation of the elastic warp threads; and

*b*. The reduction of diameter of the warp threads which, due to the reduction of their diameter releases a portion of the length of the weft threads wound about these warp threads.

The free part of the weft threads, which connects together the parallel warp threads, is correspondingly increased.

This cause of elasticity in a transverse direction, which is a function of the stretching of the net in the longitudinal direction, reduces the necessity of the deformation stated under *a*.

This explains the following fact, ascertained by experience: In spite of the stretching of the fabric when worn in belts, foundation garments, girdles, brassières, panties, and so forth, the rubber of the warp threads is not subjected to too intense deforming stresses, which ensures a longer wear.

In this fabric, the whole of the elastic threads $a'$, $a^2$, $a^3$ plays the part of a single thread.

In order to make this fabric with multiple elastic threads, it is possible to operate as follows:

*a*. When forming the warp, the warp threads come from an ordinary system of spools, but, instead of passing through each hole of the warping plates a single thread, two, three, or more spools are caused to pass through each hole. The formation of the warp is then pursued in the customary manner.

*b*. The yarn beam, once fixed to the loom or frame will be utilized as an ordinary yarn beam, but in each guide of the loom or frame, instead of passing one warp thread, the group of elementary threads (including two, three, or more, threads) which is collected in each hole of the plates will be caused to pass.

Figure 4:
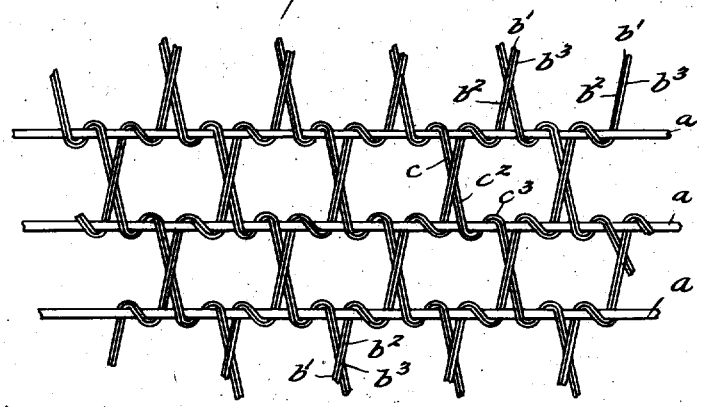
Figures 4 and 5 are diagrammatical views of modifications.
Figure 5:
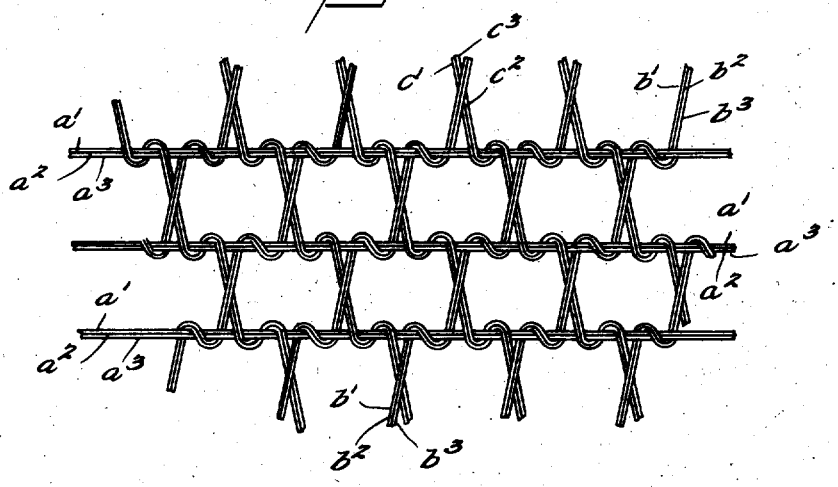

It should be well understood that the invention is not limited to the example that has just been described and that, in particular, (Figure 4) the fabric might be made with inextensible warp threads $a$, and elastic weft threads $b'$, $b^2$, $b^3$; or again (Figure 5) with elastic warp threads $a'$, $a^2$, $a^3$, and elastic weft threads $b'$, $b^2$, $b^3$, the special elasticity above mentioned being then added to the elasticity of the second series of threads.

It is apparent the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. An elastic tulle fabric comprising a series of warp threads and at least one series of weft threads, each of the threads of at least one of these series consisting of at least two independent elastic elementary threads merely juxtaposed to each other.

2. An elastic tulle fabric comprising a series of warp threads and at least one series of weft threads, each of the threads of one of these series consisting of at least two independent elastic elementary threads merely juxtaposed to each other.

3. An elastic tulle fabric comprising a series of warp threads and at least one series of weft threads, each of the threads of the warp consisting of at least two independent elastic elementary threads merely juxtaposed to each other.

4. An elastic tulle fabric comprising a series of warp threads and at least one series of weft threads, each of the threads of the warp consisting of three independent elastic elementary threads merely juxtaposed to each other.

5. An elastic tulle fabric which comprises in combination a series of warp elements and two series of weft elements inclined in opposite directions with respect to said warp threads respectively, each of these warp threads consisting of three independent elastic elementary threads merely juxtaposed to each other.

6. A stretchable elastic fabric having series of straight threads and series of interlinking threads engaging and turned around said straight threads and each of the threads of at least one of these series consisting of at least two independent elastic elementary threads merely juxtaposed to each other.

7. A stretchable elastic fabric having series of straight threads and series of interlinking threads engaging and turned around said straight threads and each of the threads of one of these series consisting of at least two independent elastic elementary threads merely juxtaposed to each other.

8. A stretchable elastic fabric having series of straight threads and series of interlinking threads engaging and turned around said straight threads and each of the threads of the straight series consisting of at least two independent elastic elementary threads merely juxtaposed to each other.

9. A stretchable elastic fabric having series of straight threads and series of interlinking threads engaging and turned around said straight threads and each of the threads of the straight series consisting of three independent elastic elementary threads merely juxtaposed to each other.

10. A stretchable elastic fabric having series of straight threads and series of interlining threads engaging and turned around said straight threads and which comprises two series of interlinking elements inclined in opposite directions with respect to the straight series threads respectively, each of the straight threads consisting of three independent elastic elementary threads merely juxtaposed to each other.

11. A fabric having considerable elasticity and contractive force in a horizontal direction and extensibility in a vertical direction, comprising elastic threads running only in a horizontal direction when in normal position and inelastic connecting threads wrapped around said elastic threads by at least a complete turn and extending from one to another in staggered relation whereby to pull directly on said elastic threads and give the fabric considerable vertical extensibility and contractive force upon the application of vertical tension.

12. A fabric having considerable elasticity and contractive force in a horizontal direction and extensibility in a vertical direction, comprising elastic threads running only in a horizontal direction when in normal position and inelastic connecting threads wrapped around said elastic threads by at least a complete turn and extending from one to another in staggered relation whereby to pull directly on said elastic threads and give the fabric considerable vertical extensibility and contractive force upon the application of vertical tension, said elastic threads and inelastic connecting threads forming when stretched an open porous structure containing a multiplicity of perforations of generally hexagonal shape.

13. A fabric having considerable elasticity and contractive force in a horizontal direction and extensibility in a vertical direction, comprising elastic threads running only in a horizontal direction when in normal position and inelastic connecting threads wrapped around said elastic threads by at least a complete turn and extending from one to another in staggered relation whereby to pull directly on said elastic threads and give the fabric considerable vertical extensibility and contractive force upon the application of vertical tension, said inelastic threads extending diagonally.

14. A fabric comprising an elastic body portion having considerable elasticity and contractive force in a horizontal direction and extensibility in a vertical direction, being composed of elastic threads running only in a horizontal direction when in normal position and inelastic connecting threads wrapped around said elastic threads by at least a complete turn and extending from one to another in staggered relation whereby to pull directly on said elastic threads and give the fabric considerable vertical extensibility and contractive force upon the application of vertical tension.

15. A stretchable elastic fabric having series of straight threads and series of interlinking threads engaging the straight threads, the series of straight threads including threads which comprise at least two independent elastic elementary threads merely juxtaposed to each other.

16. A fabric having considerable elasticity and contractive force in one direction and extensibility in a transverse direction, comprising elastic threads running only in said one direction when in normal position and inelastic connecting threads wrapped completely around said elastic threads at least a complete turn of 360° and extending from one to another in staggered relation whereby to pull directly on said elastic threads and give the fabric considerable extensibility and contractive force upon the application of tension in any direction.

17. A fabric having considerable elasticity and contractive force in one direction and extensibility in a transverse direction, comprising elastic threads running only in said one direction when in normal position and inelastic connecting threads wrapped completely around said elastic threads at least a complete turn of 360° and extending from one to another in staggered relation whereby to pull directly on said elastic threads and give the fabric considerable extensibility and contractive force upon the application of tension in any direction, said elastic threads and inelastic connecting threads forming when stretched an open porous structure containing a multiplicity of perforations of generally hexagonal shape.

18. A fabric having considerable elasticity and contractive force in one direction and extensibility in a transverse direction, comprising elastic threads running only in said one direction when in normal position and inelastic connecting threads wrapped completely around said elastic threads at least a complete turn of 360° and extending from one to another in staggered relation whereby to pull directly on said elastic threads and give the fabric considerable extensibility and contractive force upon the application of tension in any direction, said inelastic threads extending generally diagonally between the elastic threads.

19. A fabric comprising an elastic body portion having considerable elasticity and contractive force in one direction and extensibility in transverse direction, being composed of elastic threads running only in said one direction when in normal position and inelastic connecting threads wrapped completely around said elastic threads and extending from one to another in staggered relation whereby to pull directly on said elastic threads and give the fabric considerable extensibility and contractive force upon the application of vertical tension in any direction.

AUGUSTIN ISAAC.